United States Patent Office 3,243,471
Patented Mar. 29, 1966

3,243,471
ABSORBENT FOR THE SEPARATION OF OLEFINS
Eric W. Stern, Mountainside, N.J., assignor to Pullman Incorporated, a corporation of Delaware
No Drawing. Continuation of application Ser. No. 136,213, Sept. 6, 1961. This application Jan. 27, 1965, Ser. No. 428,560
10 Claims. (Cl. 260—677)

This application is a continuation of my prior and copending application Serial No. 136,213, filed September 6, 1961, now abandoned.

This invention relates to a method for separating olefins from mixtures containing the same. In one aspect this invention relates to an improved absorbent for separating olefins from more highly saturated hydrocarbons. In another aspect the invention relates to an improved method for preparing an absorbent comprising a cuprous salt.

The separation of olefins from petroleum hydrocarbons is of importance in various commercial operations. For example, among the purposes for which such separation is utilized are recovery of olefins from feeds which are to be processed by catalytic methods in which olefins have an adverse effect on the particular catalyst employed.

It is known that cuprous halides are capable of forming complexes with olefins. Cuprous halide reagents have been suggested for use in separating diolefins from hydrocarbon mixtures and have been used in the dry solid state, either alone or in admixture with other materials or carriers. Generally speaking, the preparation of admixtures of cuprous halides with supports have involved either dry-mixing techniques or methods involving the indirect deposition of the cuprous compound on the support. For example, one prior method involves the impregnation of a carrier with an aqueous solution of cupric halide, followed by the conversion of the cupric salt to cuprous by an in situ reduction. In addition to multistage and indirect methods of preparing supported cuprous halide absorbents, present-day methods lead to absorbents which are useful only within narrow operation conditions generally requiring low temperatures and high pressures.

It is an object of the invention to provide an improved process for the separation of olefins from mixtures containing the same.

Another object is to provide an improved absorbent comprising cuprous halide useful for the separation of monoolefins from mixtures containing the same.

A further object is to provide an improved and direct method for preparing cuprous halide absorbents useful in the separation of olefins from mixtures with saturated hydrocarbons.

A further object is to provide an absorbent comprising cuprous chloride which possesses improved selectivity for the separation of olefins and which is useful over a wide range of operating conditions.

Various other objects and advantages of this invention will become apparent to those skilled in the art from the accompanying description and disclosure.

In accordance with the present invention, olefin separation from mixtures containing the same is accomplished by employing, as the absorbent, silica-supported cuprous halide. In accordance with the teachings of this invention the silica-supported cuprous halide employed is prepared by the method which comprises applying a non-aqueous cuprous halide solution to silica, followed by heating of the mixture to remove the solvent and deposit the cuprous halide on the silica. The solvent employed for the cuprous halide is a normally liquid olefin, preferably a low-boiling monoolefin. The silica-supported cuprous halide prepared by this direct method of applying the cuprous salt to the silica has been found to be very selective in its ability to achieve separation of olefins, including monoolefins, from mixtures containing the same. It has been further found that the combination of cuprous halide and silica formed by the present method possesses selectivity in the sorption of olefins which is not exhibited by cuprous halides supported on other carriers, and that good selectivity is achieved without the necessity of first activating the sorbent by a series of absorption-desorption steps.

In accordance with the method of this invention, a solution of the cuprous halide is first prepared. An olefin is employed as the solvent and is preferably a low-boiling aliphatic monoolefin such as those having from 4 to 7 carbon atoms per molecule and boiling in the range of between 20° and about 200° F. Of these, the particularly referred solvents are the straight chain alpha-olefins. Typical examples of suitable solvents are 1-pentene, 1-butene, 1-hexene, 1-heptene and cyclohexene. The cuprous halide salt preferably in substantially anhydrous form is added to the solvent in any concentration, but preferably saturated or substantially saturated solutions are used. The use of diolefins as the solvent is to be avoided since diolefins form insoluble solid complexes with cuprous halides. Although any of the cuprous halides may be employed, cuprous chloride and cuprous bromide are preferred, cuprous chloride being more readily available and economical.

The solution of cuprous halide in the olefin is then applied to the silica by soaking, impregnation or spraying techniques. The content of cuprous halide in the sorbent as it is to be used may vary over a relatively wide range such as between about 2 and about 15 weight percent, expressed as copper, based on the total weight of the finished sorbent. The copper content preferably ranges between about 3 and about 8 weight percent. Depending upon the concentration of cuprous halide desired, the application of the cuprous halide solution may be repeated until the desired content is obtained. When a saturated solution of cuprous halide is employed, generally between about 0.5 and about 2 weight percent copper is deposited by each application. After the silica has been so treated with the cuprous halide solution, the mass is dried, the drying temperature depending largely upon the particular solvent employed. Generally the drying temperature ranges between about 100° and about 350° F. When more than one application of the cuprous halide solution is employed, the mass is dried prior to the subsequent treatment with the cuprous halide solution. An efficacious method for removing solvent and drying the sorbent comprises passing a hot inert gas through the bed of material.

The silica employed as the support is preferably of high surface area which, for the purposes of this invention, is defined as silica having a surface area between about 400 and about 1000 square meters per gram. The cuprous halide deposited on the silica reduces the surface area of the support, the surface area of the preferred finished sorbents of this invention generally ranging between about 200 and about 800 square meters per gram. It has been found that cuprous chloride dispersed on silica gel having a surface area within the aforesaid range, possesses unusually high selectivity for the absorption of monoolefins, and is capable of complex formation with monoolefins in mol ratios approaching the theoretical ratio of 1:1. Such desirable properties are not possessed by cuprous halide on other high surface area supports such as charcoal.

The olefins which are absorbed by the reagents of this invention include monoolefins, polyolefins, isoolefins and cycloolefins. Typical examples of olefins which may be present in the feedstocks are ethylene, propylene, butenes, pentenes, hexenes, 2-methyl-2-butene, 3-methyl-1-butene, 2-methyl-1-butene, cyclopentene, butadiene, isoprene, piperylene and other olefins commonly found in catalytically cracked gasoline fractions, natural gas and other refinery process streams or off-gases. In addition to their ability to preferentially absorb olefins from more highly saturated compounds such as paraffins, the absorbents of this invention may be used to separate alpha monoolefins from olefins having a non-terminal double bond, and straight chain olefins from branched olefins.

When employing the cuprous halide on silica separation reagents of this invention, the hydrocarbon mixture containing the olefins to be separated is passed over the reagent at a suitable flow rate, temperature and pressure. When a precalculated amount of olefin has been absorbed on the reagent, introduction of feed into the absorption zone is discontinued and desorption of the separated olefin is effected by heating the sorbent. The olefin which is released during the desorption step is removed from the sorption zone by means known to those skilled in the art such as by using an inert flush gas such as nitrogen. After desorption, feed is then passed over the sorbent in a continuous absorption-desorption cycle. It is to be understood that included within the scope of this invention is the use of the sorption reagent in the form of one bed of material or in the form of a series of beds or layers positioned in one or more absorption zones. The absorption-desorption steps may be effected as a continuous cycle by using more than one sorption zone, effecting absorption in one zone while regenerating the separation reagents in another.

The absorption step is carried out at a temperature within the range between about 40° F. and about 200° F. or higher, depending upon the boiling point of the olefin. Although olefin capacity or complex formation of the cuprous halide with olefin tends to decrease with increasing temperatures, the paraffin capacity is lowered to an even greater extent. Thus improvement of the selectivity of the absorbents of this invention, or their preferential sorption of olefins, is realized by increasing the temperature within the said range. Therefore, when the feed contains olefins in very low concentrations of the order of less than 1 to about 2 weight percent, highly efficient separation is achieved with the sorbents of this invention at the higher temperatures of between about 100° and about 200° F. When the olefin content of the feed is higher, the sorption step is preferably conducted at a temperature between about 60° and about 150° F. to obtain a good combination of selectivity and olefin capacity.

The pressure at which absorption is effected may be atmospheric, sub-atmospheric or above atmospheric. The pressure usually ranges from about 0 to about 100 pounds per square inch gauge (p.s.i.g.). The sorption step is carried out by contacting the hydrocarbon feed in the vapor phase with the solid cuprous halide-silica reagent, the flow rate of the feed being from about 500 to about 10,000 volumes of gas per hour per volume of sorbent.

The desorption step is effected within the aforesaid pressure range, at temperatures between about 200 and about 500° F., more normally desorption temperatures of between about 300 and about 900° F. being employed.

The following examples are offered as a better understanding of the present invention and are not to be construed as unnecessarily limiting thereto. In carrying out the preparation of the following reagents, the manipulative steps involving the handling of cuprous chloride were carried out under a blanket of nitrogen to prevent oxidation of the cuprous ion.

*Reagents A, B and C: Cuprous chloride supported on high-surface area silica*

A saturated solution of cuprous chloride in 1-pentene was prepared by slurrying reagent-grade cuprous chloride (minimum 90 percent purity) in 1-pentene (95 percent purity), allowing the undissolved cuprous chloride to settle. The supernatant clear solution was recanted over silica gel (14–20 mesh) in an amount sufficient to just cover the silica. The silica employed had previously been heated at 300° F. for about 16 hours in a vacuum oven and had a surface area of 783 square meters per gram. Gentle heat was applied until the 1-pentene solvent was evaporated and the solid appeared dry. During evaporation of the solvent the mixture was stirred continuously. In the preparation of silica-supported cuprous chloride reagents designated herein as A, B and C, the application of the cuprous chloride solution was repeated 4, 10 and 6 times, respectively. After application of the last coat of cuprous chloride, the material was dried at 350° F. and the dried material was sieved to remove loosely held cuprous chloride. The weight percent copper and the surface areas of the completed materials are set forth in Table I below.

*Reagent D: Cuprous chloride supported on low-surface area silica*

The procedure employed in the preparation of reagents A, B and C was repeated, except that the silica gel employed was first sintered under nitrogen for 4 hours at 1550° F. to reduce its surface area from 783 to 276 square meters per gram. It was then impregnated 6 times with the saturated cuprous chloride solution and dried at 350° F. as described above. The percent copper and surface area of the finished sorbent are given in the following Table I, this reagent being referred to as reagent D.

*Reagent E: High-surface area silica*

This sorbent consisted of high-surface area silica gel (783 square meters per gram) and was the same as that employed in the preparation of reagents A, B and C, above.

*Reagent F: Low-surface area silica*

This sorbent consisted of silica gel having a surface area of 276 square meters per gram prepared by sintering reagent E under nitrogen for 4 hours at 1550° F., and was the same as that employed in the preparation of reagent D.

*Reagent G: Unsupported cuprous chloride*

A saturated solution of cuprous chloride in 1-pentene was prepared by slurrying cuprous chloride (minimum 90 percent purity) in 1-pentene. The solution was filtered and the dissolved cuprous chloride was reprecipitated by the addition of normal pentane. The re-precipitated and purified cuprous chloride was collected by filtration and then dried at 300° F. The dried powder was stirred under nitrogen and the exclusion of light. Immediately prior to use, it was evenly distributed over glass helices positioned within the absorption zone.

The above absorbents, designated as reagents A–G, were tested to determine their efficacy as sorbents for the separation of monoolefins from saturated hydrocarbons. In carrying out these tests each of the reagents was charged to an atmospheric pressure vertical flow apparatus. Nitrogen was passed over the material in the reactor at approximately 15 cc. per minute and the reactor was heated to 350° F. for one hour. After this period, the charge was allowed to cool to the desired sorption temperature. Nitrogen was continuously passed through the system during the entire run. A mixture of approximately 10 percent by weight of 1-pentene in normal pentane was fed to the system at approximately 0.8 cc. per minute. The feed material and the effluent from the reactor were analyzed by vapor phase chromatography. A minimum of 50 cc. of hydrocarbon feed was used in each run. In the runs in which no olefin was found in the effluent after 50 cc. of feed had been passed through the reactor, the addition of feed was continued until it appeared that saturation with olefin had been achieved. The effluent was collected in a water jacketed condenser maintained at ice temperature. The reactor was maintained at the desired sorption temperature until no more reactor effluent was collected at ice temperature. The sorption step was then considered complete and thus the temperature of the bed was raised gradually to 350° F. to effect desorption. The amount of sorbent charged to the reactor, specific operating conditions and results of the tests are set forth in the following Table I. Calculations of the selectivity and capacity of the various absorbents are based on the weights of materials fed and desorbed and on the composition of these fractions as determined by vapor phase chromatography. The composition of the absorbed hydrocarbon was determined by subtracting the amounts of olefin and paraffin in the effluent collected at the absorption temperature from the amounts of these materials in the feed. The results are reported on the basis of per 100 grams of the absorbent reagent.

surface area of the silica is shown by inspection of the results obtained in run number 4 in which the sorbent consisted of cuprous chloride on low surface area silica, the selectivity of the sorbent being significantly lower than that of reagents A, B and C.

Comparison of the data of run numbers 1, 2 and 3 also shows that increasing the sorption temperature improves selectivity. Although the increase in temperature decreased olefin capacity, the reduction in paraffin capacity took place to an even greater extent. These data demonstrate that for the base balance of selectivity and olefin capacity, moderate sorbtion temperatures such as the temperature employed in run number 2 is preferred. However, when the feed contains a low concentration of olefins such as from about 0.01 to about 2 weight percent, which amounts ordinarily are removed only with difficulty, the higher temperatures are used to advantage since high olefin capacity in such a system becomes less significant.

TABLE I

| Sorbent | Cuprous chloride on silica | | | | Silica | | | | Cuprous chloride | |
|---|---|---|---|---|---|---|---|---|---|---|
| Run No | 1 | 2 | 3 | 4 | 5 | | 6 | 7 | 8 | 9 |
| Reagent | A | B | C | D | E | | E | F | G | G |
| Weight of sorbent, grams | 82.8 | 84.6 | 69.1 | 103.7 | 81.7 | | 75.3 | 106.3 | 8.1 | 8.0 |
| Percent copper | 3.3 | 7.16 | 4.9 | 4.2 | | | | | 64.1 | 64.1 |
| Mols Cu/100 grams sorbent | 0.048 | 0.11 | 0.072 | | | | | | 0.99 | 1.0 |
| Surface area, (meters²/gram) | ¹688 | 644 | ²675 | 125 | 783 | 783 | 783 | 276 | | |
| Sorption temperature, °F | 71–80 | 80–90 | 149–155 | 80–87 | 79–86 | 82–98 | 150 | 84–87 | 84–87 | 40–44 |
| Selectivity: | | | | | | | | | | |
| Percent olefin in feed | 9.2 | 11.8 | 9.6 | 10.8 | 9.6 | 8.6 | 9.1 | 10.8 | 10.0 | 10.8 |
| Percent olefin in sorbed hydrocarbon | 32.2 | 53.9 | 56.2 | 23.5 | 21.8 | 19.2 | 41.8 | 16.9 | 3.4 | 11.6 |
| Capacity: | | | | | | | | | | |
| Gms. olefin sorbed/100 gms. sorbent | 6.68 | 8.42 | 3.10 | 0.99 | 3.38 | 3.29 | 2.03 | 1.33 | 0.11 | 1.62 |
| Gms. paraffin sorbed/100 gms. sorbent | 14.09 | 7.19 | 2.39 | 3.23 | 12.10 | 13.84 | 2.83 | 6.52 | 3.1 | 12.38 |
| Mols olefin sorbed/100 gms. sorbent | 0.095 | 0.12 | 0.044 | 0.014 | 0.048 | 0.047 | 0.029 | 0.019 | 0.0016 | 0.023 |
| Mols olefin sorbed/mol Cu | 1.0 | 0.66 | 0.21 | | | | | | 0.0016 | 0.023 |
| Percent sorbed olefin recovered: | | | | | | | | | | |
| As 1-pentene | 91.0 | 72.2 | 66.3 | 92.7 | 41.1 | 58.7 | 51.4 | 88.4 | 99.8 | 96.7 |
| As 2-pentene | 10.5 | 13.9 | 11.2 | 0.35 | 50.0 | 41.3 | 39.0 | 2.2 | 0.5 | |

¹ Surface area determination is based on that of a similar preparation containing 4.3 weight percent copper.
² Estimated.

Inspection of the data of Table I above shows that the selectivity of the sorbents of this invention, namely cuprous chloride on high surface area silica (reagents A, B and C) employed in run numbers 1, 2 and 3, possess superior selectivity in the preferential separation of olefins than that of the other sorbents. It also is noted that the improved selectivity is more than the cumulative effect of the selectivities exhibited by the cuprous chloride and silica support. In fact, the powdered cuprous chloride dispersed on glass helices used as the sorbent in run numbers 8 and 9 showed very little ability to complex with the 1-pentene and actually absorbed the pentane preferentially. Comparison of the results of runs 8 and 9 shows that, although a decrease in the sorption temperature increased the olefin capacity, the improvement in selectivity was only slight due to the fact that the paraffin capacity was also increased.

A comparison of the results obtained in run number 1 with those obtained in run number 5 shows that the cuprous chloride supported on silica possessed significantly greater selectivity in the separation of 1-pentene from normal pentane than the silica support alone and that this improvement in selectivity is due to an increase olefin capacity rather than a decrease in paraffin capacity. The results of run number 1 also show that the cuprous chloride supported on silica is active on a mol for mol basis in forming the complex with the olefin. Comparison of the results obtained in run number 1 with those obtained in run number 2 shows that an increase in the extent of coverage of the silica surface with cuprous chloride increased selectivity. That the superior properties of the sorbents of this invention is a function of the

*Reagent H: Celite*

This reagent consists of Celite in the form of pellets (³⁄₁₆" x ³⁄₁₆") having a low surface area of about 2.7 meters per gram.

*Reagent I: Cuprous chloride supported on Celite*

The procedure employed in the preparation of reagents A, B and C above was repeated, except that instead of using silica gel as the support, Celite (reagent H) was used. The Celite was impregnated with the 1-pentene solution of cuprous chloride 5 times and dried at 350° F., and the dried mixture was sieved to remove loosely held cuprous chloride. The completed low surface area reagent weighed 78 grams and, upon analysis, was shown to contain 5.2 percent copper and had a surface area of 3.4 meters per gram.

*Reagent J: Alundum*

This reagent consisted of Alundum in the form of pellets (³⁄₁₆" x ³⁄₁₆") and had a surface area of about 2.7 meters per gram.

*Reagent K: Cuprous chloride supported on Alundum*

The procedure employed in the preparation of reagents A, B and C above was repeated, except that instead of using silica gel as the support, Alundum (reagent J) was used. The Alundum was impregnated with the 1-pentene solution of cuprous chloride 5 times and dried at 350° F., and the dried mixture was sieved to remove loosely held cuprous chloride. The completed low surface area reagent weighed 109.7 grams and, upon analysis, was shown to contain 4.2 percent copper and had a surface area of 2.9 meters per gram.

Reagent L: Charcoal

This reagent consisted of charcoal (4–10 mesh) having a surface area of 1042 meters per gram.

Reagent M: Cuprous chloride supported on charcoal

The procedure employed in the preparation of reagents A, B and C was repeated, except that instead of using silica gel as the support, charcoal (reagent L) was employed. The impregnation of the charcoal was repeated 5 times and the impregnated material was dried at 350° F. The dried material was sieved to remove loosely held cuprous chloride. The completed sorbent weighed 71.9 grams and contained 5.2 percent copper. Another batch of cuprous chloride supported on charcoal was prepared by impregnating the charcoal with the 1-pentene solution of cuprous chloride, yielding a finished reagent weighing 65.9 grams containing 3.0 percent copper and having a surface area of 999 meters per gram.

Reagent N: Cuprous chloride supported on charcoal

Approximately 200 ml. of activated charcoal designated as reagent L was placed in a vessel and heated under vacuum at 350° F. for about 16 hours. The heated activated charcoal was then cooled to about minus 112° F. with stirring. 150 ml. of a saturated solution of cuprous chloride in 1-pentene was added and the resulting slurry was warmed to room temperature gradually with stirring and under vacuum. When the charcoal appeared to be dry, it was again cooled and another 150 ml. of saturated cuprous chloride solution was added. This procedure was repeated 7 times. After the last impregnation step, the mixture was dried at 350° F. under vacuum. The supported cuprous chloride was sieved to remove fines and a charge of 93.3 grams of reagent containing 6.9 percent copper and having a surface area of 824 meters per gram was charged to the reactor, these latter steps being carried out in an atmosphere of nitrogen.

The above reagents H through N were tested for their efficacy in the separation of olefins from mixtures containing the same, employing a feed containing 10 percent 1-pentene in normal pentane using the same sorption and desorption procedure described above in connection with runs 1–9 of Table I. The specific operating conditions and results are set forth in the following Table II.

of olefins exhibited by Celite and Alundum and cuprous chloride supported on these materials was very low. In addition, such materials preferentially absorbed the paraffin. Not only did such low surface area materials exhibit low selectivity in preferential separation of olefins but, as shown by the results obtained in run numbers 16–21, charcoal, a high surface area material, as well as cuprous chloride supported on charcoal exhibited substantially no ability to sorb olefin.

Various alterations and modifications of the method and sorbents of this invention may become apparent to those skilled in the art without departing from the scope of this invention.

Having described my invention, I claim:

1. A process for the separation of monoolefins from a mixture containing the same, which comprises contacting said mixture with a sorbent consisting of cuprous halide supported on silica in the vapor phase at a temperature between about 40° and about 200° F., said cuprous halide or silica absorbing monoolefin from said mixture, heating the cuprous halide on silica containing sorbed monoolefin to liberate the monoolefin absorbed thereon, said cuprous halide on silica sorbent having a surface area between about 200 and about 800 square meters per gram and being prepared by the method which consists essentially of dissolving cuprous halide in a normally liquid aliphatic monoolefin, applying the resulting solution to silica having a surface area between about 400 and about 1000 square meters per gram and heating the resulting mixture to evaporate said aliphatic monoolefin and deposit the cuprous halide on said silica.

2. A process for the separation of monoolefin from a mixture of monoolefin and paraffins which comprises contacting said mixture in the vapor state at a substantially atmospheric pressure and a temperature between about 40° F. and about 200° F. with a solid sorbent consisting of cuprous chloride supported on silica containing between about 3 and about 8 weight percent copper based on the total weight of the sorbent, and having a surface area between about 200 and about 800 square meters per gram, said sorbent absorbing monoolefin from said mixture, heating the sorbent containing said monoolefin to liberate the monoolefin, said sorbent being prepared by the method which consists essentially of applying a solution of cuprous chloride dissolved in a monoolefin solvent boiling between 20° F. and about 200° F. to silica having a surface area between about 400 and about 1000 square meters per gram in an amount sufficient to provide a

TABLE II

| Sorbent | Celite | Cuprous chloride | | Alundum | Cuprous chloride on Alundum | | Charcoal | | Cuprous chloride on charcoal | | | |
|---|---|---|---|---|---|---|---|---|---|---|---|---|
| Run No | 10 | 11 | 12 | 13 | 14 | 15 | 16 | 17 | 18 | 19 | 20 | 21 |
| Reagent | H | I | I | J | K | K | L | L | M | M | M | N |
| Weight of sorbent, grams | 63.1 | 78.0 | 78.0 | 103.8 | 109.7 | 109.7 | 53.8 | 54.3 | 71.9 | 65.9 | 71.9 | 93.3 |
| Percent copper | | 5.2 | 5.2 | | 4.2 | 4.2 | | | 5.2 | 3.0 | 5.2 | 6.9 |
| Mols Cu/100 grams sorbent | | 0.077 | 0.077 | | 0.064 | 0.064 | | | 0.083 | 0.047 | 0.083 | 0.11 |
| Surface area (meters $^2$/gram) | 2.7 | 3.4 | | 2.7 | 2.9 | | 1,042 | 1,042 | | 999 | | 824 |
| Sorption temperature, °F | 68–75 | 75–76 | 42–48 | 66–80 | 64–92 | 43–56 | 80–83 | 84–87 | 68–80 | 77–84 | 40–50 | 79–90 |
| Selectivity: | | | | | | | | | | | | |
| Percent olefin in feed | 9.5 | 10.6 | 11.0 | 10.7 | 10.5 | 10.2 | 10.8 | 10.9 | 11.0 | 10.7 | 10.8 | 10.1 |
| Percent olefin in sorbed hydrocarbon | 0.3 | 1.6 | 10.4 | 0.6 | 10.8 | 9.5 | 9.5 | 9.7 | 11.2 | 11.7 | 13.1 | 9.8 |
| Capacity: | | | | | | | | | | | | |
| Grams olefin sorbed/100 grams sorbent | 0.0063 | 0.013 | 1.56 | 0.0096 | 0.21 | 1.79 | 2.55 | 2.54 | 1.68 | 2.40 | 3.27 | 1.40 |
| Grams paraffin sorbed/100 grams sorbent | 1.81 | 0.79 | 15.08 | 1.68 | 1.74 | 17.05 | 24.26 | 23.59 | 13.36 | 18.10 | 21.70 | 12.97 |
| Mols olefin sorbed/100 grams sorbent | 0.00009 | 0.00018 | 0.022 | 0.00014 | 0.003 | 0.025 | 0.036 | 0.036 | 0.024 | 0.034 | 0.047 | 0.020 |
| Mols olefin sorbed/mol Cu | | 0.0012 | | | 0.045 | | | | | | | |
| Percent sorbed olefin recovered: | | | | | | | | | | | | |
| As 1-pentene | 103 | 99.7 | 93.4 | 99.7 | 98.5 | 98.4 | 93.4 | 87.3 | 91.2 | 89.6 | 90.7 | 103 |
| As 2-pentene | | | | | | | | 2.04 | | 0.50 | | |

Inspection of the results obtained in run numbers 10–15 of Table II demonstrate that the preferential separation cuprous chloride content in the finished sorbent within the said range, and evaporating the solvent from the resulting mixture to deposit the cuprous chloride on the silica.

3. A process for the separation of monoolefins from a mixture containing the same which comprises contacting a mixture containing less than 2 percent olefins with a sorbent consisting of cuprous chloride supported on silica in the vapor phase at a substantially atmospheric pressure and at a temperature between about 100° F. and about 200° F., said cuprous chloride on silica absorbing monoolefin from said mixture, heating the cuprous chloride on silica containing sorbed monoolefin to liberate the olefin absorbed thereon, said cuprous chloride on silica sorbent having a surface area between about 200 and about 800 square meters per gram and being prepared by the method which consists essentially of dissolving cuprous chloride in a normally liquid alpha-monoolefin, applying the resulting solution to silica having a surface area between about 400 and about 1000 square meters per gram and heating the resulting mixture to evaporate said alpha-monoolefin and deposit cuprous chloride on said silica.

4. A method for preparing a reagent composed of cuprous halide supported on silica for the separation of monoolefins from mixtures containing the same, which consists essentially of dissolving cuprous halide in a low-boiling monoolefin as solvent, applying the resulting solution to silica having a surface area between about 400 and about 1000 square meters per gram, evaporating said low boiling monoolefin solvent to deposit cuprous halide on said silica, the resulting cuprous halide supported on silica reagent having a surface area between about 200 and about 800 square meters per gram.

5. The method of claim 4 in which said cuprous halide is cuprous chloride.

6. The method of claim 4 in which said cuprous halide is cuprous bromide.

7. The method of claim 4 in which said solvent is an alpha-monoolefin.

8. The method of claim 7 in which said alpha-monoolefin is 1-pentene.

9. The method of claim 7 in which said alpha-monoolefin is 1-hexene.

10. A composition consisting of cuprous halide supported on silica containing between about 3 and about 8 weight percent copper based on the total weight of the composition and having a surface area between about 200 and about 800 square meters per gram prepared by the method which consists essentially of dissolving cuprous halide in a monoolefin solvent boiling in the range of between 20° F. and about 200° F., applying the resulting solution to silica having a surface area between about 400 and about 1000 square meters per gram in an amount sufficient to provide a copper content in the finished composition within the aforesaid amount, and evaporating said monoolefin solvent to deposit cuprous halide on said silica.

No references cited.

ALPHONSO D. SULLIVAN, *Primary Examiner.*